US012695108B2

(12) United States Patent
Hirao et al.

(10) Patent No.: US 12,695,108 B2
(45) Date of Patent: Jul. 28, 2026

(54) CELL, MODULE AND MODULE HOUSING DEVICE

(71) Applicant: KYOCERA CORPORATION, Kyoto (JP)

(72) Inventors: Kazuki Hirao, Aira (JP); Akihiro Hara, Kirishima (JP); Masahiko Higashi, Kirishima (JP); Tetsuro Fujimoto, Kirishima (JP); Makoto Koi, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 763 days.

(21) Appl. No.: 17/917,216

(22) PCT Filed: Feb. 4, 2021

(86) PCT No.: PCT/JP2021/004180
§ 371 (c)(1),
(2) Date: Oct. 5, 2022

(87) PCT Pub. No.: WO2021/205734
PCT Pub. Date: Oct. 14, 2021

(65) Prior Publication Data
US 2023/0163338 A1 May 25, 2023

(30) Foreign Application Priority Data
Apr. 9, 2020 (JP) ................................. 2020-070651

(51) Int. Cl.
*H01M 8/2475* (2016.01)
*H01M 8/1213* (2016.01)
*H01M 8/12* (2016.01)

(52) U.S. Cl.
CPC ....... *H01M 8/2475* (2013.01); *H01M 8/1213* (2013.01); *H01M 2008/1293* (2013.01)

(58) Field of Classification Search
CPC ............. H01M 8/2475; H01M 8/1213; H01M 2008/1293; H01M 4/86; H01M 4/861; H01M 8/02; H01M 8/2432; H01M 2300/0074; H01M 4/9033; H01M 8/1226; H01M 8/12; H01M 8/04; H01M 8/1246; H01M 8/1253; Y02E 60/50
See application file for complete search history.

(56) References Cited

U.S. PATENT DOCUMENTS

| | | | |
|---|---|---|---|
| 8,349,511 B2 | 1/2013 | Kobayashi et al. | |
| 2016/0164108 A1 | 6/2016 | Matsuno et al. | |
| 2017/0033394 A1* | 2/2017 | Yamauchi | ........... H01M 8/2425 |
| 2018/0212251 A1 | 7/2018 | Imanaka | |
| 2019/0123374 A1 | 4/2019 | Kim et al. | |
| 2021/0119243 A1 | 4/2021 | Imanaka | |

FOREIGN PATENT DOCUMENTS

| | | | | |
|---|---|---|---|---|
| CN | 107851817 A | | 3/2018 | |
| EP | 2495792 B1 | | 7/2017 | |
| JP | H04-61752 A | | 2/1992 | |
| JP | 2004-119161 A | | 4/2004 | |
| JP | 2004-362913 A | | 12/2004 | |
| JP | 2012-23017 A | | 2/2012 | |
| JP | 5122013 B1 | * | 1/2013 | |
| JP | 2013-77542 A | | 4/2013 | |
| JP | 2015-35416 A | | 2/2015 | |
| JP | 2017084609 A | * | 5/2017 | |
| JP | 2017-103244 A | | 6/2017 | |
| JP | 2022-25082 A | | 2/2022 | |
| WO | WO-2017018455 A1 | * | 2/2017 | ........... H01M 7/8657 |
| WO | 2019/188299 A1 | | 10/2019 | |

OTHER PUBLICATIONS

Kamiya et al., "Oxygen Self-Diffusion in Cerium Oxide", Journal of the Ceramic Society of Japan 106 [10] p. 1023-1026 (1998), Department of Applied Chemistry, Kanagawa Institute of Technology, Japan, Accepted Aug. 10, 1998.

* cited by examiner

*Primary Examiner* — Muhammad S Siddiquee
(74) *Attorney, Agent, or Firm* — Procopio, Cory, Hargreaves & Savitch LLP

(57) ABSTRACT

A cell includes an element portion that includes: a fuel electrode; a solid electrolyte layer; an air electrode; and an intermediate layer located between the solid electrolyte layer and the air electrode. The solid electrolyte layer or the intermediate layer includes: a first site; and a second site that is located closer to the air electrode or closer to a center part of the element portion than the first site and that has a smaller porosity or a lower density than the first site.

10 Claims, 21 Drawing Sheets

| | POROSITY (AREA%) | |
|---|---|---|
| | OUTER PERIPHERAL PART | CENTER PART |
| FIRST REGION | 20.0 | 16.7 |
| SECOND REGION | 15.9 | 13.7 |
| THIRD REGION | 0.00 | 0.43 |

FIG. 6

CELL, MODULE AND MODULE HOUSING DEVICE

CROSS-REFERENCE TO RELATED APPLICATIONS

This application is national stage application of International Application No. PCT/JP2021/004180, filed on Feb. 4, 2021, which designates the United States, incorporated herein by reference, and which claims the benefit of priority from Japanese Patent Application No. 2020-070651, filed on Apr. 9, 2020, the entire contents of which are incorporated herein by reference.

TECHNICAL FIELD

The present disclosure relates to a cell, a module and a module housing device.

BACKGROUND ART

Recently, various fuel cells, and cell stack devices including a plurality of fuel cells have been proposed as next-generation energy sources. A fuel cell is a type of cell capable of obtaining electrical power by using a fuel gas such as a hydrogen-containing gas and an oxygen-containing gas such as air.

In such a fuel cell, for example, an intermediate layer may be provided between a solid electrolyte layer and an air electrode in an element portion in the fuel cell (see Patent Document 1).

CITATION LIST

Patent Literature

Patent Document 1: JP 2015-35416 A

SUMMARY OF INVENTION

According to one aspect of the embodiments, a cell includes an element portion including a fuel electrode, a solid electrolyte layer, an air electrode, and an intermediate layer located between the solid electrolyte layer and the air electrode. The solid electrolyte layer or the intermediate layer includes a first site, and a second site that is located closer to the air electrode or closer to a center part of the element portion than the first site and that has a smaller porosity or a lower density than the first site.

BRIEF DESCRIPTION OF DRAWINGS

FIG. 6 is a diagram showing the porosity of each region in the outer peripheral part and center part of the element portion.

DESCRIPTION OF EMBODIMENTS

Embodiments of a cell, a module and a module housing device disclosed in the present application will now be described in detail with reference to the accompanying drawings. The present invention is not limited by the following embodiments.

Note that the drawings are schematic, and the relationship between the dimensions of each element, the ratio of each element, or the like may differ from reality. There may be cases in which portions of the drawings differ from each other in relation to each other in terms of dimension, ratio, etc.

Recently, various fuel cells, and cell stack devices including a plurality of fuel cells have been proposed as next-generation energy sources. A fuel cell is a type of cell capable of obtaining electrical power by using a fuel gas such as a hydrogen-containing gas and an oxygen-containing gas such as air.

In such a fuel cell, for example, an intermediate layer may be provided between a solid electrolyte layer and an air electrode in an element portion in the fuel cell.

However, in the fuel cell described above, the durability of the fuel cell can be improved.

Thus, the achievement of a technology capable of enhancing the durability of the fuel cell is expected.

Configuration of Cell

Figure 1A:
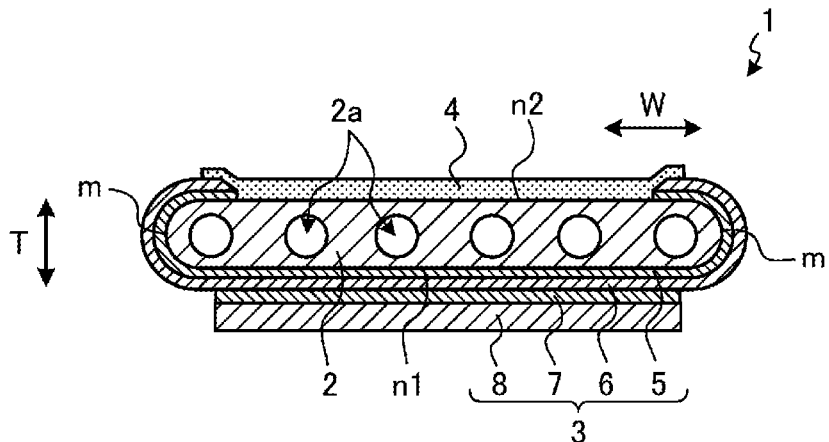
FIG. 1A is a horizontal cross-sectional view illustrating an example of a cell according to an embodiment.
Figure 1B:
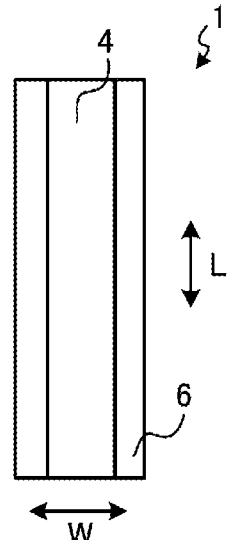
FIG. 1B is a side view of the example of the cell according to the embodiment, as viewed from an interconnector side.

Referring to FIGS. 1A and 1B, an example of a solid oxide fuel cell will be described as a cell according to an embodiment.

FIG. 1A is a horizontal cross-sectional view illustrating an example of a cell 1 according to an embodiment. FIG. 1B is a side view of the example of the cell 1 according to the embodiment, as viewed from the interconnector 4 side. FIG. 1A and FIG. 1B are enlarged views illustrating portions of the respective configurations of the cell 1. The example of the cell 1 viewed from an air electrode 8 side will be described later.

In the example illustrated in FIGS. 1A and 1B, the cell 1 is a hollow and flat plate, elongated in shape. As illustrated in FIG. 1B, the overall shape of the cell 1 viewed from the side surface is, for example, a rectangle in which the side length in a length direction L is from 5 cm to 50 cm and the length in a width direction W perpendicular to the length direction L is from 1 cm to 10 cm. The overall thickness in a thickness direction T of the cell 1 is between 1 mm to 5 mm.

As illustrated in FIG. 1A, the cell 1 includes a conductive support substrate 2, an element portion 3, and an interconnector 4. The support substrate 2 has a pillar shape with a pair of opposing flat surfaces n1, n2 and a pair of side surfaces m in circular arc shape connecting the flat surfaces n1, n2.

The element portion 3 is provided on the flat surface n1 of the support substrate 2. The element portion 3 such as that described above includes a fuel electrode 5, a solid electrolyte layer 6, an intermediate layer 7, and an air electrode 8. In the example illustrated in FIG. 1A, the interconnector 4 is provided on the flat surface n2 of the cell 1.

As illustrated in FIG. 1B, the interconnector 4 may extend to the upper and lower ends of the cell 1. At a lower end portion of the cell 1, the interconnector 4 and the solid electrolyte layer 6 are exposed on the surface. As illustrated in FIG. 1A, the solid electrolyte layer 6 is exposed at the surface at the pair of side surfaces m in a circular arc shape of the cell 1. The interconnector 4 need not extend to the lower end of the cell 1. The cell 1 may include a reinforcing layer 9 described below in the region between the lower end and the interconnector 4.

Hereinafter, each of the components constituting the cell 1 will be described.

The support substrate 2 includes gas-flow passages 2a in which gas flows. The example of the support substrate 2 illustrated in FIG. 1A includes six gas-flow passages 2a. The support substrate 2 has gas permeability and allows the fuel gas flowing through the gas-flow passages 2a to pass through to the fuel electrode 5. The support substrate 2 may be electrically conductive. The support substrate 2 having conductivity collects electricity generated in the element portion 3 to the interconnector 4.

The material of the support substrate 2 includes, for example, an iron group metal component and an inorganic oxide. For example, the iron group metal component may be Ni (nickel) and/or NiO. The inorganic oxide may be a specific rare earth element oxide.

Generally known materials can be used for the fuel electrode 5. The fuel electrode 5 may be a porous electrically conductive ceramic, for example, a ceramic that contains $ZrO_2$ in which calcium oxide, magnesium oxide or rare earth element oxide are in solid solution, and Ni and/or NiO. As the rare earth element oxide, for example, $Y_2O_3$ or the like is used. $ZrO_2$ in which calcium oxide, magnesium oxide or rare earth element oxide are in solid solution is sometimes called stabilized zirconia. The stabilized zirconia also includes partially stabilized zirconia.

The solid electrolyte layer 6 is an electrolyte that bridges ions between the fuel electrode 5 and the air electrode 8. At the same time, the solid electrolyte layer 6 has a gas blocking property and hardly causes leakage of fuel gas and oxygen-containing gas.

The material of the solid electrolyte layer 6 may be, for example, $ZrO_2$ in which 3 to 15 mole % of a rare earth element oxide is in solid solution. As the rare earth element oxide, for example, $Y_2O_3$ or the like is used. As long as the solid electrolyte layer 6 has the above characteristics, other materials may be used for the solid electrolyte layer 6.

The intermediate layer 7 functions as a diffusion prevention layer. When strontium (Sr) contained in the air electrode 8, which will be described later, diffuses into the solid electrolyte layer 6, a resistive layer of $SrZrO_3$ is formed on the solid electrolyte layer 6. The intermediate layer 7 suppresses the diffusion of Sr and makes it difficult to form $SrZrO_3$.

The material of the intermediate layer 7 is not particularly limited as long as generally used for the diffusion prevention layer of Sr. The material of the intermediate layer 7 includes, for example, cerium oxide ($CeO_2$) in which a rare earth element except Ce (cerium) is in solid solution. As the rare earth element, gadolinium (Gd), samarium (Sm), or the like are used.

The material of the air electrode 8 is not particularly limited as long as generally used for the air electrode. The material of the air electrode 8 may be, for example, an electrically conductive ceramic such as a so-called $ABO_3$-type perovskite oxide.

The material of the air electrode 8 may be, for example, a composite oxide in which Sr and La coexist at the A site. Examples of such a composite oxide include $La_xSr_{1-x}Co_yFe_{1-y}O_3$, $La_xSr_{1-x}MnO_3$, $La_xSr_{1-x}FeO_3$, and $La_xSr_{1-x}CoO_3$. Note that x satisfies $0<x<1$ and y satisfies $0<y<1$.

The air electrode 8 has gas permeability. The open porosity of the air electrode 8 may be, for example, 20% or more, and is particularly in the range of from 30% to 50%.

The material of the interconnector 4 may be a lanthanum chromite-based perovskite oxide ($LaCrO_3$-type oxide) or a lanthanum strontium titanium-based perovskite oxide ($LaSrTiO_3$-based oxide). These materials are electrically conductive and are not reduced or oxidized upon contact with a fuel gas such as a hydrogen-containing gas, and an oxygen-containing gas such as air.

The interconnector 4 is dense and hardly causes leakage of fuel gas flowing through the gas-flow passage 2a inside the support substrate 2 and oxygen-containing gas flowing outside the support substrate 2. The interconnector 4 may have a relative density of 93% or more, particularly 95% or more.

Configuration of Cell Stack Device

Figure 2A:
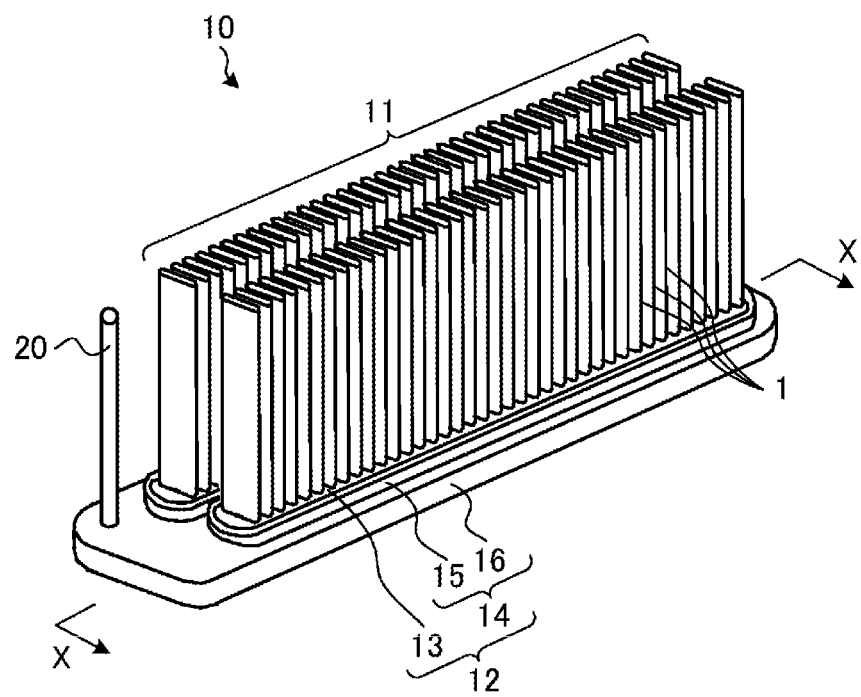
FIG. 2A is a perspective view illustrating an example of a cell stack device according to the embodiment.
Figure 2B:
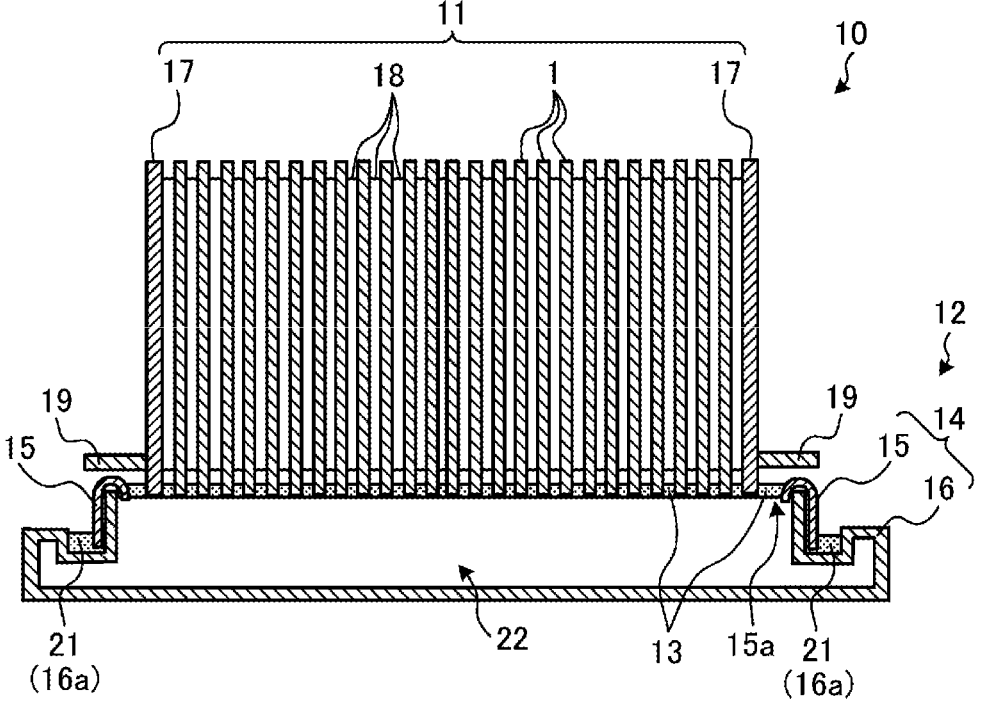
FIG. 2B is a cross-sectional view taken along line X-X illustrated in FIG. 2A.
Figure 2C:
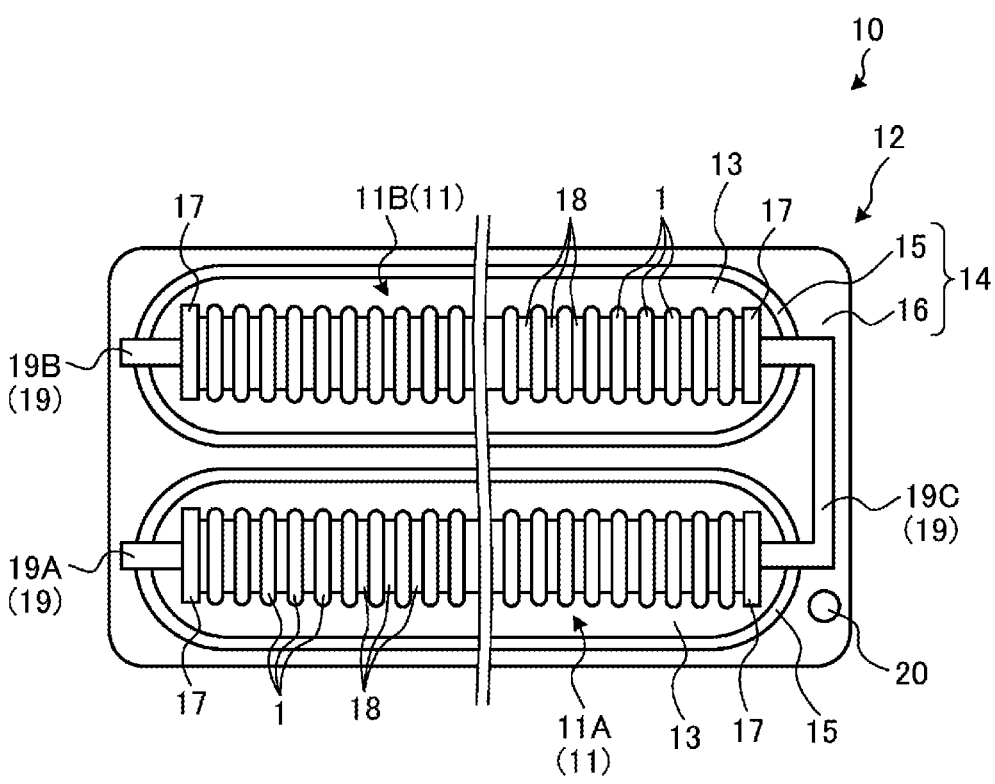
FIG. 2C is a top view illustrating the example of the cell stack device according to the embodiment.

The cell stack device 10 according to the present embodiment using the cell 1 described above will be described with reference to FIGS. 2A to 2C. FIG. 2A is a perspective view illustrating an example of a cell stack device 10 according to the embodiment. FIG. 2B is a cross-sectional view taken along line X-X illustrated in FIG. 2A. FIG. 2C is a top view illustrating an example of the cell stack device 10 according to the embodiment.

As illustrated in FIG. 2A, the cell stack device 10 includes a cell stack 11 including a plurality of cells 1 arranged (stacked) in the thickness direction T (see FIG. 1A) of the cell 1, and a fixing member 12.

The fixing member 12 includes a fixing material 13 and a support member 14. The support member 14 supports the cells 1. The fixing material 13 fixes the cells 1 to the support member 14. The support member 14 includes a support body 15 and a gas tank 16. The support body 15 and the gas tank 16, which constitute the support member 14, are made of a metal and have electrical conductivity.

As illustrated in FIG. 2B, the support body 15 includes an insertion hole 15a into which the lower end portions of the plurality of cells 1 are inserted. The lower end portions of the plurality of cells 1 and the inner wall of the insertion hole 15a are joined by the fixing material 13.

The gas tank 16 includes an opening portion for supplying a reactive gas to the plurality of cells 1 through the insertion hole 15a, and includes a recessed groove 16a provided around the opening portion. One end portion of the support body 15 is joined to the gas tank 16 by a bonding material 21 filled in the recessed groove 16a of the gas tank 16.

In the example illustrated in FIG. 2A, fuel gas is stored in an internal space 22 formed by the support body 15 and the gas tank 16, which constitute the support member 14. A gas flow pipe 20 is connected to the gas tank 16. The fuel gas is supplied through the gas flow pipe 20 to the gas tank 16, and is supplied from the gas tank 16 to the gas-flow passage 2a (see FIG. 1A) inside the cell 1. The fuel gas supplied to the gas tank 16 is generated by a reformer 102 (see FIG. 10) described later.

The hydrogen-rich fuel gas can be produced by steam reforming the raw fuel. When the fuel gas is generated by steam reforming, the fuel gas contains water vapor.

In the example illustrated in FIG. 2A, two rows of cell stacks 11 having a plurality of cells 1 are provided, and each row of cell stacks 11 is fixed to the support body 15. Two through holes are provided on the upper surface of the gas tank 16. Each support body 15 is disposed in the two through holes so as to be aligned with the insertion hole 15a. The internal space 22 is formed of one gas tank 16 and two support bodies 15.

The insertion hole 15a has, for example, an oval shape in top surface view. The insertion hole 15a has, for example, a length in the arrangement direction or thickness direction T of the cell 1, which is greater than the distance between the two end current collectors 17 located at opposite ends of the cell stack 11. The width of the insertion hole 15a is greater than, for example, the length in the width direction W of the cell 1 (see FIG. 1A).

As illustrated in FIG. 2B, the fixing material 13, which has solidified, fills the joint between the inner wall of the insertion hole 15a and the lower end portion of each cell 1. Thus, the inner wall of the insertion hole 15a and each of the lower end portions of the plurality of cells 1 are joined and fixed, and the lower end portions of the cells 1 are joined and fixed to each other. The gas-flow passage 2a of each cell 1 communicates at the lower end portion with the internal space 22 of the support member 14.

The fixing material 13 and the bonding material 21 may be of low conductivity, such as a glass. The specific material may be an amorphous glass or the like, or a crystallized glass.

As the crystallized glass, for example, a $SiO_2$—CaO system, a MgO—$B_2O_3$ system, a $La_2O_3$—$B_2O_3$—MgO system, a $La_2O_3$—$B_2O_3$—ZnO system or a $SiO_2$—CaO—ZnO system can be adopted, but any material of a $SiO_2$—MgO system may be used.

As illustrated in FIG. 2B, a conductive member 18 is interposed between adjacent cells 1 among the plurality of cells 1. The conductive member 18 electrically connects the fuel electrode 5 of one adjacent cell 1 and the air electrode 8 of the other adjacent cell 1 in series. The details of the conductive member 18 connected between the adjacent cells 1 will be described later.

As illustrated in FIG. 2B, the end current collector 17 is connected to each of the outermost cells 1 in the arrangement direction of the plurality of cells 1. The end current collector 17 is connected to a conductive portion 19 protruding outside the cell stack 11. The conductive portion 19 collects electricity generated by the power generation of the cells 1 and draws it to the outside. In FIG. 2A, the end current collectors 17 are not illustrated.

As illustrated in FIG. 2C, the cell stack device 10, in which two cell stacks 11A and 11B, both formed by the cells 1 in a line, are connected in series, functions as a single battery. Thus, the conductive portions 19 of the cell stack device 10 are distinguished into a positive terminal 19A, a negative terminal 19B, and a connection terminal 19C.

The positive terminal 19A is a positive electrode for outputting the electrical power generated by the cell stacks 11 to the outside, and is electrically connected to the end current collector 17 on the positive electrode side of the cell stack 11A. The negative terminal 19B is a negative electrode for outputting the electrical power generated by the cell stacks 11 to the outside, and is electrically connected to the end current collector 17 on the negative electrode side of the cell stack 11B.

The connection terminal 19C electrically connects the end current collector 17 on the negative side in the cell stack 11A and the end current collector 17 on the positive side in the cell stack 11B.

Details of Element Portion

Figure 3:
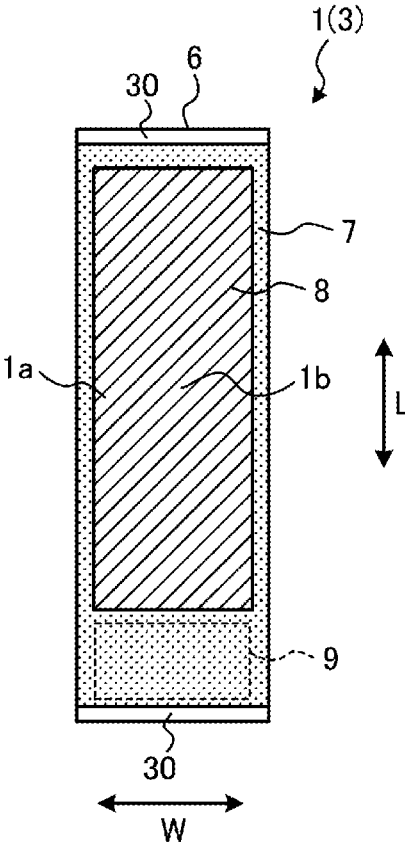
FIG. 3 is a side view of the example of the cell according to the embodiment, as viewed from an air electrode side.

Details of the element portion 3 according to the embodiment will be described with reference to FIGS. 3 to 9. FIG. 3 is a side view of an example of the cell 1 according to the embodiment, as viewed from the air electrode 8 side.

As illustrated in FIG. 3, the intermediate layer 7 is formed over the entire surface of the solid electrolyte layer 6 as viewed from the air electrode 8 side, except for the upper and lower end portions of the cell 1. In other words, third sites 30 in which the intermediate layer 7 is not located on the surface of the solid electrolyte layer 6, are provided at the upper and lower end portions of the cell 1 respectively, as viewed from the air electrode 8 side.

Such third sites 30 are provided along at least two sides of the cell 1 respectively, and each have a predetermined width, for example, about 5 mm, from each side. In the embodiment, the third sites 30 are formed with approximately equal widths along the top and bottom sides as the two sides of the cell 1, respectively.

A reinforcing layer 9 is provided between the solid electrolyte layer 6 and the intermediate layer 7 above the third site 30 at the lower end portion of the cell 1. When the lower end portion of the cell 1 is fixed by a fixing member 12 (see FIG. 2A), the cell 1 may be damaged by stress from the fixing member 12. The reinforcing layer 9 reduces the likelihood of the cell 1 being damaged when the cell 1 is fixed.

When the interconnector 4 does not extend to the lower end portion of the cell 1, the reinforcing layer 9 may be provided on the flat surface 2n of the support substrate 2 in the region between the lower end portion of the cell 1 and the interconnector 4.

The reinforcing layer 9 is made of, for example, $ZrO_2$ in which 3 to 15 mole % of a rare earth element oxide is in solid solution. As the rare earth element oxide, for example, $Y_2O_3$ or the like is used. As long as the reinforcing layer 9 has the above characteristics, the reinforcing layer 9 may be formed using other materials or the like.

The air electrode 8 is provided on the surface of the intermediate layer 7 in a region between the third site 30 on the upper side of the cell 1 and the reinforcing layer 9.

The element portion 3 of the cell 1 according to the embodiment includes an outer peripheral part 1*a* and a center part 1*b*. The outer peripheral part 1*a* is a region located near each side when the cell 1 is viewed from the air electrode 8 side, and the center part 1*b* is a central region surrounded by the outer peripheral part 1*a* when the cell 1 is viewed from the air electrode 8 side.

The outer peripheral part 1*a* may be a region located near the contour of the element portion 3 or near the contour of the air electrode 8 when the cell 1 is viewed from the air electrode 8 side. In that case, the outer peripheral part 1*a* includes the contour of the element portion 3 or the air electrode 8. The outer peripheral part 1*a* may include the inside of the contour of the element portion 3 in the cell 1 or may include the outside of the contour of the element portion 3.

Figure 4:
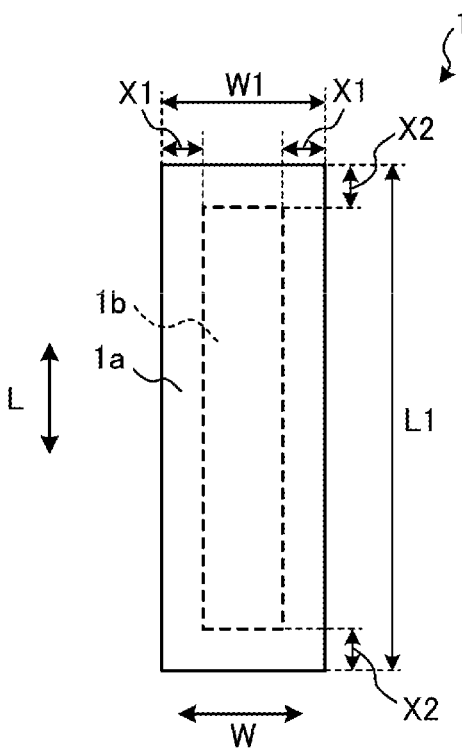
FIG. 4 is a diagram for illustrating an outer peripheral part and center part of an element portion according to the embodiment.

As illustrated in FIG. 4, in the element portion 3, the outer peripheral part 1*a* is a region in which the distance from the long side along the length direction L is no more than a predetermined distance X1 and the distance from the short side along the width direction W is no more than a predetermined distance X2. FIG. 4 is a diagram for describing the outer peripheral part 1*a* and the center part 1*b* of the element portion 3 according to the embodiment.

In the embodiment, the distance X1 is, for example, 25% of the length W1 of the short side of the element portion 3. The distance X2 is, for example, 15% of the length L1 of the long side of the element portion 3.

Figure 5:
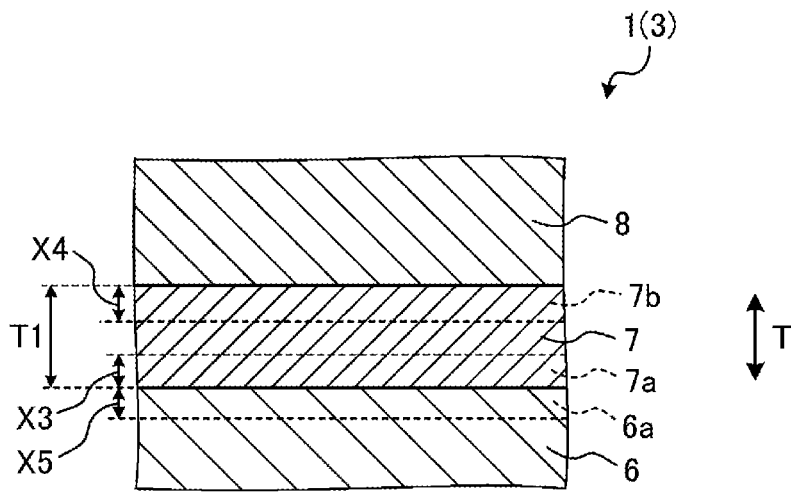
FIG. 5 is an enlarged cross-sectional view illustrating an example of the element portion according to the embodiment.

FIG. 5 is an enlarged cross-sectional view illustrating an example of the element portion 3 according to the embodiment, which is an enlarged cross-sectional view of the intermediate layer 7 and its vicinity. As illustrated in FIG. 5, in the element portion 3, the solid electrolyte layer 6 is layered on the fuel electrode 5 (see FIG. 1A), the intermediate layer 7 is layered on the solid electrolyte layer 6, and the air electrode 8 is layered on the intermediate layer 7.

The intermediate layer 7 includes a first region 7*a* near the interface with the solid electrolyte layer 6 and a second region 7*b* near the interface with the air electrode 8. The first region 7*a* is a region in which the distance from the interface between the solid electrolyte layer 6 and the intermediate layer 7 is no more than a predetermined distance X3.

The second region 7*b* is a region where the distance from the interface between the intermediate layer 7 and the air electrode 8 is equal to or less than a predetermined distance X4. In the embodiment, such distances X3 and X4 may be each, for example, ⅓ of the thickness T1 of the intermediate layer 7.

The solid electrolyte layer 6 includes a third region 6*a* near the interface with the intermediate layer 7 in a cross-sectional view. The third region 6*a* is a region where the distance from the interface between the solid electrolyte layer 6 and the intermediate layer 7 is no more than a predetermined distance X5. In the embodiment, such a distance X5 may be, for example, ⅓ of the thickness T1 of the intermediate layer 7.

In the embodiment, the porosity of the first region 7*a*, the second region 7*b*, and the third region 6*a* described above is controlled to enhance the durability of the cell 1. FIG. 6 is a diagram showing the porosity of each region in the outer peripheral part 1*a* and the center part 1*b* of the element portion 3.

As shown in FIG. 6, in the embodiment, the porosity of the intermediate layer 7 in the first region 7*a* near the interface with the solid electrolyte layer 6 is larger than the porosity of the intermediate layer 7 in the second region 7*b* near the interface with the air electrode 8.

The intermediate layer 7 in the first region 7*a* near the interface with the solid electrolyte layer 6 is an example of the first site, and the intermediate layer 7 in the second region 7*b* near the interface with the air electrode 8 is an example of the second site.

In the embodiment, the porosity of the first region 7*a* is larger than that of the second region 7*b* in both the outer peripheral part 1*a* and the center part 1*b* of the element portion 3.

Thus, by increasing the porosity of the first region 7*a* in the intermediate layer 7, the first region 7*a* of the intermediate layer 7 can function as a stress relieving layer, so that the intermediate layer 7 can be made difficult to peel off from the solid electrolyte layer 6.

By reducing the porosity of the second region 7*b* in the intermediate layer 7, the function as the diffusion prevention layer of Sr can be maintained.

That is, in the embodiment, the intermediate layer 7 can maintain the function as the diffusion prevention layer of Sr, and can hardly be separated from the solid electrolyte layer 6. Thus, according to the embodiment, the durability of the cell 1 can be enhanced.

In the embodiment, the porosity of the intermediate layer 7 in the outer peripheral part 1*a* of the element portion 3 is larger than the porosity of the intermediate layer 7 in the center part 1*b* of the element portion 3. The intermediate layer 7 in the outer peripheral part 1*a* of the element portion 3 is another example of the first site, and the intermediate layer 7 in the center part 1*b* of the element portion 3 is another example of the second site.

In the embodiment, the porosity of the outer peripheral part 1*a* is larger than that of the center part 1*b* in both the first region 7*a* and the second region 7*b* of the intermediate layer 7.

Thus, by increasing the porosity of the intermediate layer 7 in the outer peripheral part 1*a* of the element portion 3, the intermediate layer 7 of the outer peripheral part 1*a*, which contributes less to power generation than the center part 1*b*, can be made to function with emphasis on the stress relieving effect rather than the diffusion prevention effect.

That is, in the embodiment, by increasing the porosity of the outer peripheral part 1*a*, the intermediate layer 7 can be made difficult to peel off from the outer peripheral part 1*a* of the element portion 3. Thus, according to the embodiment, the durability of the cell 1 can be enhanced.

In the embodiment, the porosity of the intermediate layer 7 may range from 5% to 30%. By setting the porosity of the intermediate layer 7 to 5% or more, the stress relieving effect due to the voids can be sufficiently obtained, and even when the cell 1 is subjected to a temperature cycle and a thermal stress is applied to the intermediate layer 7, the intermediate layer 7 hardly peels off.

On the other hand, by setting the porosity of the intermediate layer 7 to 30% or less, the intermediate layer 7 can be made to have a strength such that the intermediate layer 7 does not peel off.

As described above, since the porosity of the intermediate layer 7 ranges from 5% to 30% in the embodiment, the intermediate layer 7 can be made difficult to peel off. Thus, according to the embodiment, the durability of the cell 1 can be enhanced.

The porosity of the intermediate layer 7 may specifically range from 10% to 30%, and further from 13% to 25%. The porosity of the first region 7a may range from 15% to 30%, particularly from 16% to 27%. The porosity of the second region 7b may range from 10% to 25% particularly from 12% to 22%.

In the embodiment, the average diameter of the voids formed in the intermediate layer 7 may be in the range from 0.1 µm to 1.0 µm, particularly from 0.2 µm to 0.8 µm. This makes it difficult for the intermediate layer 7 to peel off from the solid electrolyte layer 6 and suppresses the diffusion of Sr.

In the embodiment, the porosity of the third region 6a of the solid electrolyte layer 6 in the outer peripheral part 1a of the element portion 3 is smaller than that of the third region 6a of the solid electrolyte layer 6 in the center part 1b of the element portion 3. That is, in the embodiment, the third region 6a of the solid electrolyte layer 6 in the outer peripheral part 1a of the element portion 3 is denser than the third region 6a of the solid electrolyte layer 6 in the center part 1b of the element portion 3.

Thus, in the outer peripheral part 1a of the element portion 3 in which peeling of the solid electrolyte layer 6 tends to occur, the strength of the solid electrolyte layer 6 can be enhanced by making the third region 6a dense. That is, in the embodiment, by densifying the solid electrolyte layer 6 of the outer peripheral part 1a, the solid electrolyte layer 6 can be made difficult to peel off from the outer peripheral part 1a of the element portion 3.

Thus, according to the embodiment, the durability of the cell 1 can be enhanced.

In the embodiment, it is described above that the third region 6a of the solid electrolyte layer 6 in the outer peripheral part 1a of the element portion 3 is denser than the third region 6a of the solid electrolyte layer 6 in the center part 1b of the element portion 3. However, the entirety of the solid electrolyte layer 6 in the thickness direction of the solid electrolyte layer 6 in the outer peripheral part 1a of the element portion 3 may be denser than the entirety of the sold electrolyte layer 6 in the thickness direction of the solid electrolyte layer 6 in the center part 1b of the element portion 3. The solid electrolyte layer 6 in the outer peripheral part 1a of the element portion 3 is another example of the first site, and the solid electrolyte layer 6 in the center part 1b of the element portion 3 is another example of the second site.

As a result, the strength of the solid electrolyte layer 6 on the whole in the outer peripheral part 1a of the element portion 3 can be enhanced, so that the solid electrolyte layer 6 hardly peels off from the outer peripheral part 1a of the element portion 3.

Figure 7:
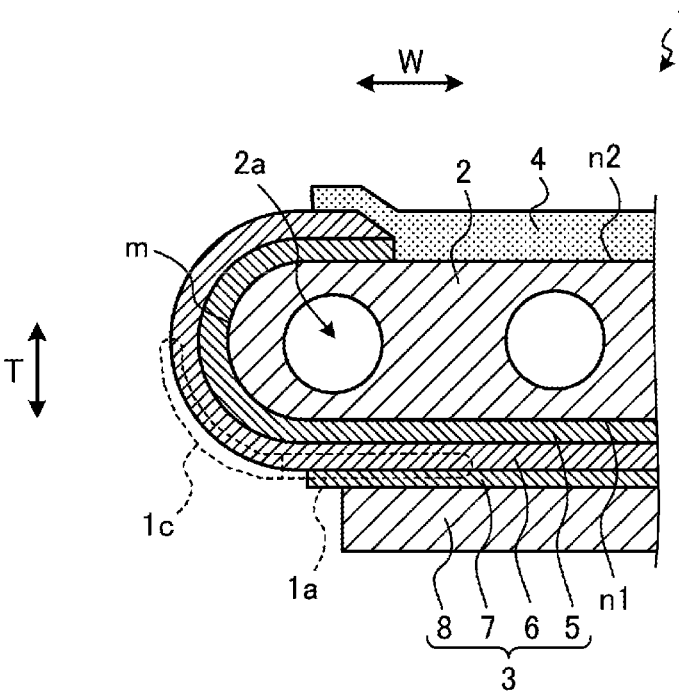
FIG. 7 is an enlarged horizontal cross-sectional view illustrating the example of the cell according to the embodiment.

In the cell 1 according to the embodiment, the location where the solid electrolyte layer 6 having a high density, i.e., a small porosity, is disposed, is not limited to the outer peripheral part 1a. FIG. 7 is an enlarged horizontal cross-sectional view illustrating an example of the cell 1 according to the embodiment.

As illustrated in FIG. 7, the cell 1 includes a curved portion 1c adjacent to the outer peripheral part 1a. The curved portion 1c is the portion located near the air electrode 8, among the side surfaces m having a circular arc shape. The curved portion 1c is, in other words, a portion of the side surfaces m where the distance to the air electrode 8 is smaller than the distance to the interconnector 4. In the embodiment, a solid electrolyte layer 6 denser than the center part 1b (see FIG. 4) may also be disposed in the curved portion 1c.

Thus, since the strength of the solid electrolyte layer 6 in the curved portion 1c of the cell 1 can be enhanced, the solid electrolyte layer 6 hardly peels off from the curved portion 1c of the cell 1.

The porosity and average diameter of the voids in the first region 7a, the second region 7b, and the third region 6a can be determined, for example, by the following technique. First, the cell 1 is cut to obtain cross sections of the first region 7a, the second region 7b, and the third region 6a.

The cross-sections of the first region 7a, the second region 7b, and the third region 6a are observed by SEM (scanning electron microscope), and a photograph taken at, for example, 3000 times magnification is obtained. The porosity can be obtained by performing image processing on the photograph to calculate the total area of the voids relative to the entire area of the image.

By applying image processing to the photograph, the average diameter of the voids can be determined. The average diameter of the voids obtained by the image processing is the average value of the diameters obtained by converting the areas of the voids in the cross-sectional photograph into circles. For example, analysis by binarization can be used for image processing by using analysis software (Image J from Wayne Rasband).

In the embodiment, as illustrated in FIG. 3, the cell 1 may include a third site 30, where the intermediate layer 7 is not located on the surface of the solid electrolyte layer 6, near at least two sides, when viewed from the air electrode 8 side.

The intermediate layer 7 may include a dense film with a thickness less than the first region 7a at the interface with the solid electrolyte layer 6. At this time, in the case where the third site 30 is not formed in the cell 1 and the dense film of the intermediate layer 7 is formed in a manner to reach each side of the cell 1, when an impact is applied to the cell 1 from the outside, the direct impact is applied to the dense film of the intermediate layer 7 that reaches the side where the impact is applied. As a result, a crack may occur in the dense film of the intermediate layer 7, which is thin and dense and prone to cracking, and the crack may propagate to the element portion 3.

On the other hand, in the embodiment, since the cell 1 includes the third site 30, even when an external impact is applied to the side on which the third site 30 is formed, the dense film of the intermediate layer 7 can be suppressed from cracking.

That is, in the embodiment, the intermediate layer 7 can be made difficult to crack. Thus, according to the embodiment, the durability of the cell 1 can be enhanced.

Figure 8:
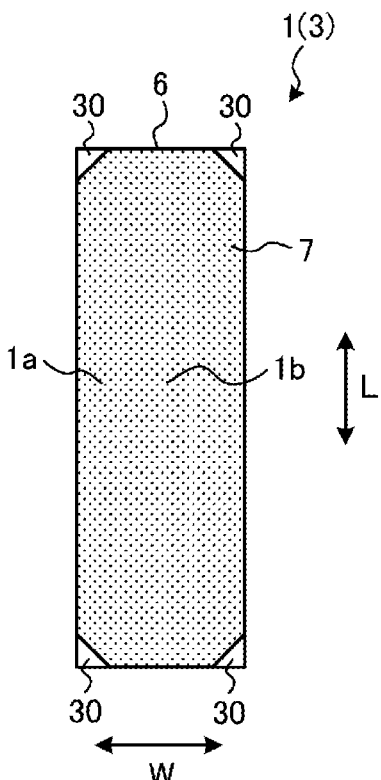
FIG. 8 is a side view illustrating another example of the element portion according to the embodiment.
Figure 9:
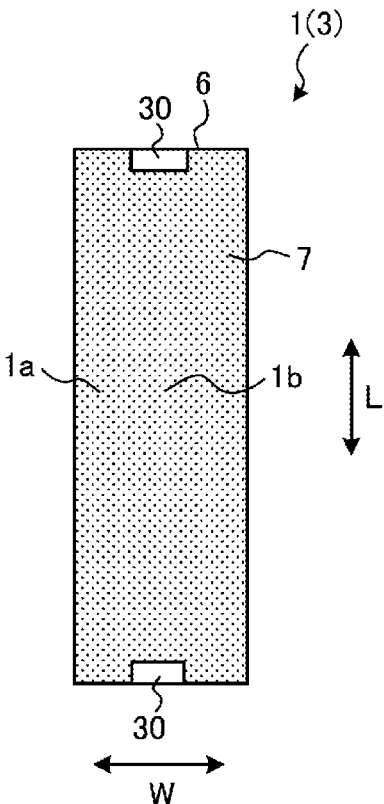
FIG. 9 is a side view illustrating another example of the element portion according to the embodiment.

The arrangement of the third site 30 in the cell 1 according to the embodiment is not limited to the example illustrated in FIG. 3. FIGS. 8 and 9 are side views illustrating another example of the element portion 3 according to the embodiment. In FIGS. 8 and 9, the air electrode 8 and the reinforcing layer 9 are omitted for ease of understanding.

As illustrated in FIG. 8, the third site 30 may be provided such that the four corners of the cell 1 viewed from the air electrode 8 side are cut off. As illustrated in FIG. 9, the third site 30 may be provided in a rectangular shape on a part of the upper end portion and on a part of the lower end portion of the cell 1 as viewed from the air electrode 8 side.

In the embodiment, as illustrated in FIG. 3, the intermediate layer 7 may also be formed on the surface of the reinforcing layer 9 where the diffusion prevention layer is not required because the air electrode 8 is not formed.

The intermediate layer 7 according to the embodiment may contain at least one element selected from the group consisting of iron (Fe), silicon (Si), sodium (Na), chlorine (Cl), copper (Cu), titanium (Ti) and aluminum (Al) as an impurity.

Thus, when the intermediate layer 7 is formed, the growth of crystal grains in the intermediate layer 7 can be suppressed, thus making it difficult for cracks to form in the intermediate layer 7. Thus, according to the embodiment, the durability of the cell 1 can be enhanced.

The intermediate layer 7 according to the embodiment may contain, for example, 1000 ppm (0.1 mass %) or less in total of the above-described impurity elements. For example, the content of each of Fe, Si, Na and Cl may be 200 ppm (0.02 mass %) or less. For example, the content of each of Cu, Ti and Al may be 50 ppm (0.005 mass %) or less.

The intermediate layer 7 may include rare earth elements other than Gd and Sm, for example, such as La (lanthanum), Pr (praseodymium), Nd (neodymium), or Y (yttrium)e. For example, in the case where the material of the intermediate layer 7 is cerium oxide ($CeO_2$) with Gd in solid solution, the intermediate layer 7 may contain at least any one of La, Pr, Nd, Sm and Y in a total amount of about 20 ppm (0.002 mass %).

The intermediate layer 7 may include Zr (zirconium), Ca (calcium), Sr (strontium), Mg (magnesium), Co (cobalt), Mn (manganese), or Ni (nickel). These elements may diffuse into the intermediate layer 7 from members disposed near the intermediate layer 7.

In the embodiment, the intermediate layer 7 may include flat crystal grains in the first region 7a. In the first region 7a of the intermediate layer 7, the long diameter of the flat crystal grains may range from 10 nm to 100 μm, and the average value of the long diameter may range from 100 nm to 10 μm. Such flat crystal grains may form the dense film of the intermediate layer 7 described above.

The contact length per unit length between the crystal grains of the intermediate layer 7 and the crystal grains of solid electrolyte layer 6 at a boundary portion between the first region 7a of the intermediate layer 7 and the solid electrolyte layer 6 may be larger than the contact length per unit length between the crystal grains of the intermediate layer 7 and the crystal grains of air electrode 8 at a boundary portion between the second region 7b of the intermediate layer 7 and the air electrode 8.

Module

Figure 10:
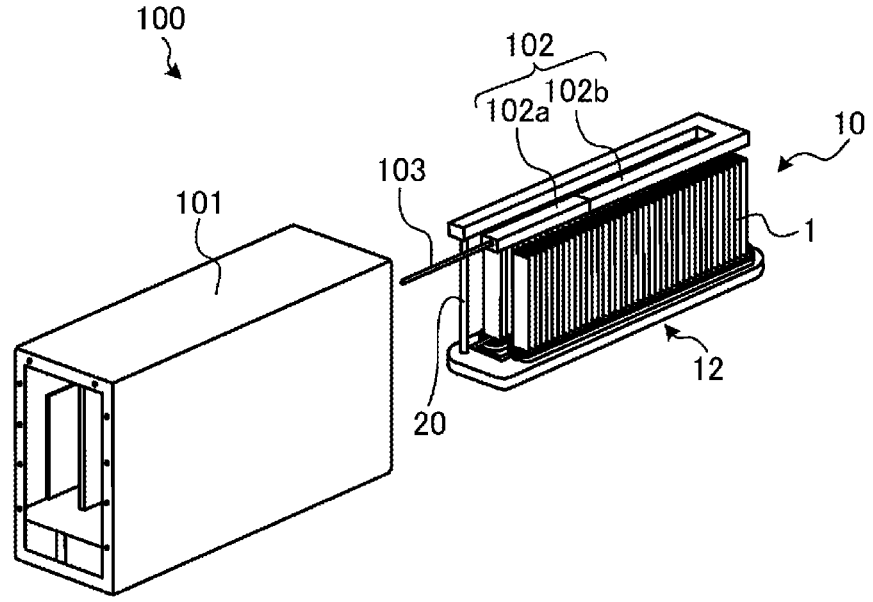
FIG. 10 is an exterior perspective view illustrating an example of a module according to an embodiment.

A module 100 according to an embodiment of the present disclosure using the cell stack device 10 described above will be described with reference to FIG. 10. FIG. 10 is an exterior perspective view illustrating the module 100 according to the embodiment. FIG. 10 illustrates a state in which the front and rear surfaces, which are part of the housing container 101, are removed and the cell stack device 10 of the fuel cell contained therein is taken out rearward.

As illustrated in FIG. 10, the module 100 includes a housing container 101 and a cell stack device 10 contained in the housing container 101. A reformer 102 is disposed above the cell stack device 10.

The reformer 102 reforms raw fuel such as natural gas or kerosene to generate fuel gas and supplies it to the cell 1. The raw fuel is supplied to the reformer 102 through a raw fuel supply pipe 103. The reformer 102 may include a vaporizing unit 102a that vaporizes water and a reforming unit 102b. The reforming unit 102b includes a reforming catalyst (not illustrated) for reforming raw fuel into fuel gas. The reformer 102 such as that described above can perform steam reforming, which is an efficient reformation reaction.

The fuel gas generated by the reformer 102 is supplied to the gas-flow passage 2a (see FIG. 1A) of the cell 1 through the gas flow pipe 20, the gas tank 16, and the support member 14.

In the module 100 having the above-described structure, the temperature in the module 100 during normal power generation is about 500 to 1000° C. due to combustion of gas and power generation of the cell 1.

As described above, the module 100 is configured by housing the cell stack device 10 having high durability, so that the module 100 having high durability can be obtained.

Module Housing Device

Figure 11:
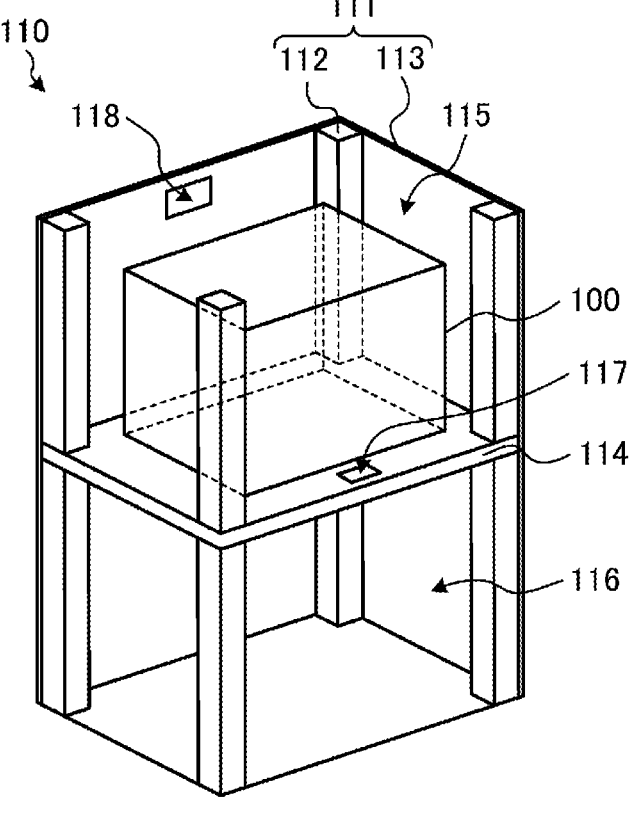
FIG. 11 is an exploded perspective view schematically illustrating an example of a module housing device according to an embodiment.

FIG. 11 is an exploded perspective view illustrating an example of the module housing device 110 according to an embodiment. The module housing device 110 according to the embodiment includes an external case 111, a module 100 illustrated in FIG. 10, and an auxiliary device (not illustrated). The auxiliary device operates the module 100. The module 100 and the auxiliary device are housed in the external case 111. Note that in FIG. 11, part of the configuration is omitted.

The external case 111 of the module housing device 110 illustrated in FIG. 11 includes a support 112 and an external plate 113. The dividing plate 114 divides the external case 111 vertically. The space above the dividing plate 114 in the external case 111 is the module housing chamber 115 that accommodates the module 100, and the space below the dividing plate 114 in the external case 111 is the auxiliary device housing chamber 116 that accommodates the auxiliary device operating the module 100. In FIG. 11, the auxiliary device accommodated in the auxiliary device housing chamber 116 is omitted.

The dividing plate 114 includes an air flow communication opening 117 for enabling the air of the auxiliary device housing chamber 116 to flow to the module housing chamber 115. The external plate 113 constituting the module housing chamber 115 includes an exhaust opening 118 for exhausting air in the module housing chamber 115.

In the module housing device 110, the module housing device 110 having high durability can be obtained by providing the module 100 having high durability in the module housing chamber 115 as described above.

Various Variations

Next, the element portions according to various variations of the embodiment will be described with reference to FIGS. 12 to 18.

In the embodiment described above, a so-called "vertically striped type" cell stack device, in which only one element portion including a fuel electrode, a solid electrolyte layer, and an air electrode is provided on the surface of the support substrate, is exemplified. However, the present disclosure can be applied to a horizontally striped type cell stack device with an array of so-called "horizontally striped type" cells, in which a plurality of element portions are provided on the surface of a support substrate at mutually separated locations, and adjacent element portions are electrically connected to each other.

Although the present embodiment exemplifies the case where a hollow flat plate-shaped support substrate is used, the present disclosure can also be applied to a cell stack device using a cylindrical type support substrate. As will be described later, the present disclosure can also be applied to a flat plate cell stack device in which so-called "flat plate" cells are stacked in the thickness direction.

In the above embodiment, an example in which a fuel electrode is provided on a support substrate and an air electrode is disposed on a surface of a cell, is illustrated.

However, the present disclosure can also be applied to a cell stack device that has an opposite arrangement to the above, that is, an arrangement in which an air electrode is provided on a support substrate and a fuel electrode is disposed on a surface of a cell.

In the aforementioned embodiments, the "cell", the "cell stack device", the "module", and the "module housing device" are exemplified by a fuel cell, a fuel cell stack device, a fuel cell module, and a fuel cell device, respectively. However, they may be exemplified by an electrolytic cell, an electrolytic cell stack device, an electrolytic module, and an electrolytic device, respectively.

Figure 12:
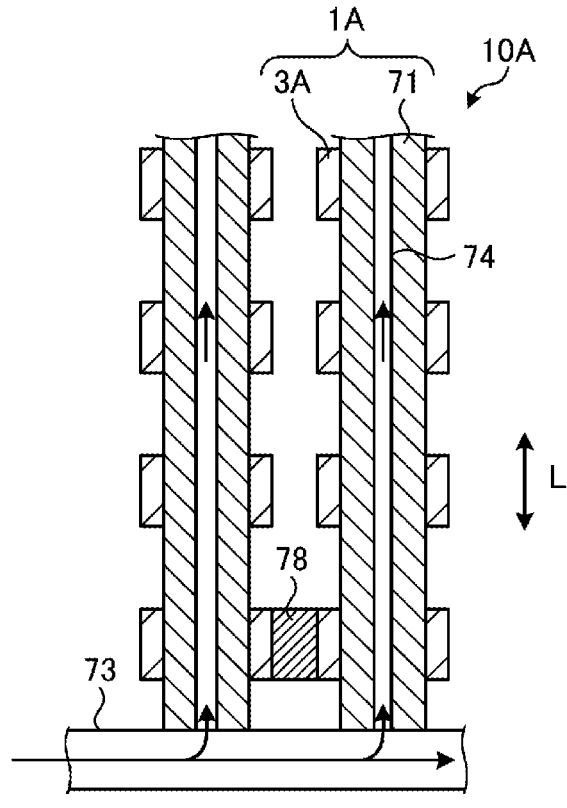
FIG. 12 is a cross-sectional view illustrating a cell according to a first variation of the embodiment.

FIG. 12 is a cross-sectional view illustrating a cell according to a first variation of the embodiment. As illustrated in FIG. 12, the cell stack device 10A includes a plurality of cells 1A extending in the length direction L from a pipe 73 that distributes fuel gas. The cell 1A includes a plurality of element portions 3A on the support substrate 71. A gas-flow passage 74 through which the gas flows from the pipe 73 is provided inside the support substrate 71. Each element portion 3A on the support substrate 71 is electrically connected by a connection portion (not illustrated). The plurality of cells 1A are electrically connected to each other via a conductive member 78. The conductive members 78 are each located between the element portions 3A each included in a corresponding one of the cells 1A and electrically connect adjacent cells 1A to each other.

In the first variation, the porosity of the intermediate layer in the first region near the interface with the solid electrolyte layer is larger than the porosity of the intermediate layer in the second region near the interface with the air electrode. Thus, the durability of the cell 1A can be enhanced.

In the first variation, the porosity of the intermediate layer in the outer peripheral part of the element portion 3A is larger than the porosity of the intermediate layer in the center part of the element portion 3A. Thus, the durability of the cell 1A can be enhanced.

In the first variation, the third region of the solid electrolyte layer in the outer peripheral part of the element portion 3A is denser than the third region of the solid electrolyte layer in the center part of the element portion 3A. Thus, the durability of the cell 1A can be enhanced.

Figure 13:
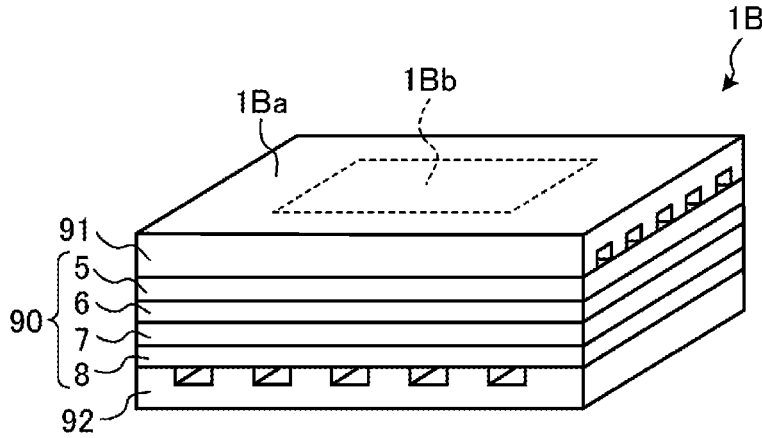
FIG. 13 is a perspective view illustrating a flat plate cell according to a second variation of the embodiment.
Figure 14:
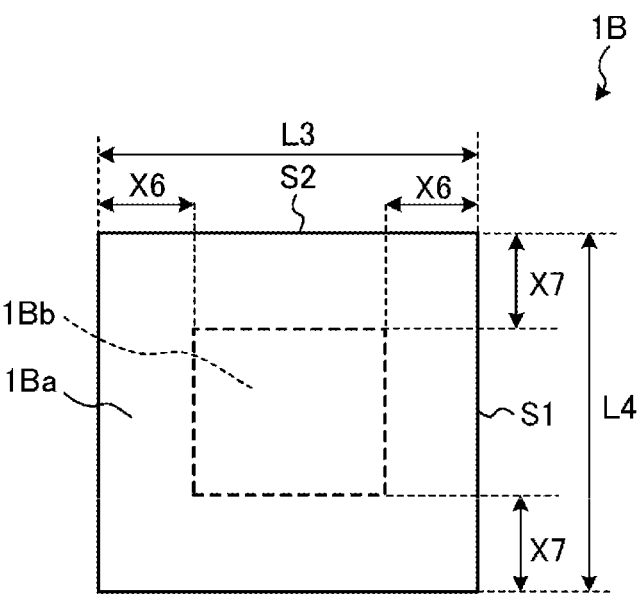
FIG. 14 is a diagram for describing an outer peripheral part and a center part of an element portion according to a second variation of the embodiment.

FIG. 13 is a perspective view illustrating a flat plate cell according to a second variation of the embodiment. FIG. 14 is a diagram for describing the outer peripheral part 1Ba and the center part 1Bb in the element portion 90 according to a second variation of the embodiment.

As illustrated in FIG. 13, the cell 1B includes an element portion 90 in which a fuel electrode 5, a solid electrolyte layer 6, an intermediate layer 7 and an air electrode 8 are stacked. In a cell stack device in which a plurality of flat plate cells are stacked, for example, a plurality of cells 1B are electrically connected to each other by conductive members 91 and 92 which are metal layers adjacent to each other. The conductive members 91 and 92 electrically connect adjacent cells 1B and have a gas-flow passage for supplying gas to the fuel electrode 5 or the air electrode 8.

As illustrated in FIG. 14, the element portion 90 of the cell 1B includes an outer peripheral part 1Ba and a center part 1Bb. The outer peripheral part 1Ba is a region located near each side of the element portion 90 when the cell 1B is viewed in plan view, and the center part 1Bb is a central region surrounded by the outer peripheral part 1Ba when the cell 1B is viewed in plan view. In FIGS. 13 and 14, when the cell is viewed in plan view, the outer shape of the cell 1B coincides with the outer shape of the element portion 90. The contour of the cell 1B may be larger than that of the element portion 90, and the contour of the cell 1B may be arranged to surround the contour of the element portion 90.

As illustrated in FIG. 14, the outer peripheral part 1Ba is a region in which the distance from one side S1 is no more than a predetermined distance X6 and the distance from the other side S2 is no more than a predetermined distance X7 in the element portion 90.

In the second variation, the distance X6 is, for example, 25% of the length L3 of the other side S2 of the element portion 90. The distance X7 is, for example, 25% of the length L4 of the one side S1 of the element portion 90.

In the second variation, the porosity of the intermediate layer 7 in the first region (that is, near the interface with the solid electrolyte layer 6) is larger than that of the intermediate layer 7 in the second region (that is, near the interface with the air electrode 8). Thus, the durability of the cell 1B can be enhanced.

In the second variation, the porosity of the intermediate layer 7 in the outer peripheral part 1Ba of the element portion 90 is larger than that of the intermediate layer 7 in the center part 1Bb of the element portion 90. Thus, the durability of the cell 1B can be enhanced.

In the second variation, the third region of the solid electrolyte layer 6 in the outer peripheral part 1Ba of the element portion 90 is denser than the third region of the solid electrolyte layer 6 in the center part 1Bb of the element portion 90. Thus, the durability of the cell 1B can be enhanced.

Figure 15:
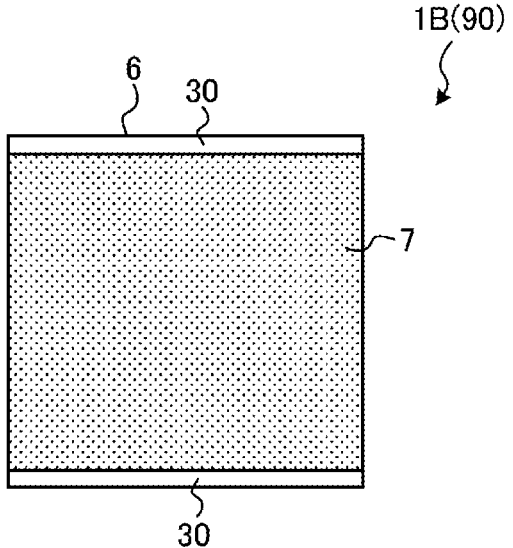
FIG. 15 is a bottom view illustrating the example of the element portion according to the second variation of the embodiment.

FIG. 15 is a bottom view illustrating an example of the element portion 90 according to the second variation of the embodiment, and is a view for illustrating the arrangement of the intermediate layer 7 and the third site 30 in the cell 1B. As illustrated in FIG. 15, in the second variation, the third site 30 may be provided along each of the two sides facing each other in the cell 1B.

Thus, even when an external impact is applied to the two sides on which the third site 30 is formed, the intermediate layer 7 can be made difficult to crack. Thus, according to the second variation, the durability of the cell 1B can be enhanced.

Figure 16:
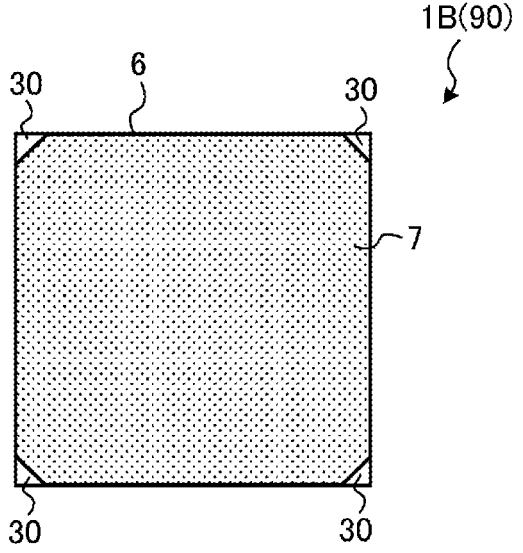
FIG. 16 is a bottom view illustrating another example of the element portion according to the second variation of the embodiment.
Figure 17:
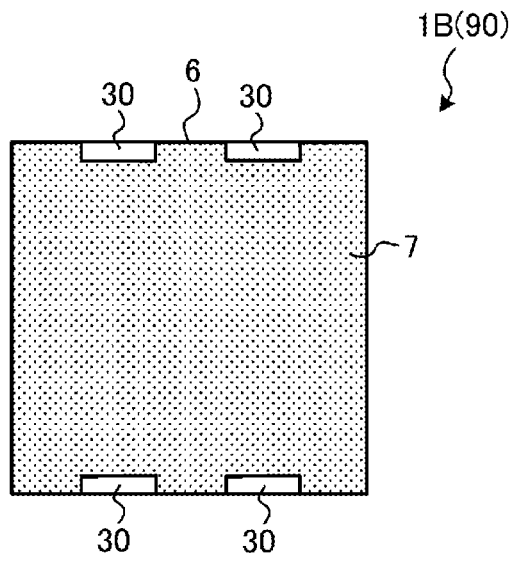
FIG. 17 is a bottom view illustrating another example of the element portion according to the second variation of the embodiment.
Figure 18:
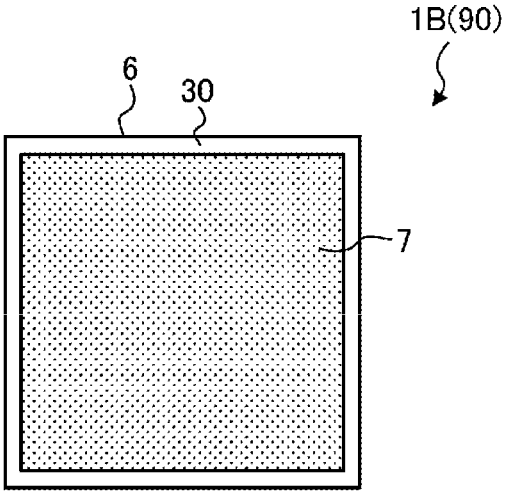
FIG. 18 is a bottom view illustrating another example of the element portion according to the second variation of the embodiment.

The arrangement of the third site 30 in the cell 1B according to the second variation is not limited to the example illustrated in FIG. 15. FIGS. 16 to 18 are bottom views illustrating another example of an element portion 90 according to the second variation of the embodiment.

As illustrated in FIG. 16, the third site 30 may be provided such that the four corners of the cell 1B viewed from the air electrode 8 (see FIG. 13) side are cut off. As illustrated in FIG. 17, the third site 30 may be provided in a rectangular shape in a part of the two sides facing each other in the cell 1B as viewed from the air electrode 8 side. As illustrated in FIG. 18, the third site 30 may be provided along all four sides of the cell 1B as viewed from the air electrode 8 side.

As described above, the cell 1 (1A, 1B) according to embodiment includes the element portion 3 (3A, 90) that includes the fuel electrode 5, the solid electrolyte layer 6, the air electrode 8, and the intermediate layer 7 located between the solid electrolyte layer 6 and the air electrode 8. The solid electrolyte layer 6 or the intermediate layer 7 includes a first site, and a second site that is located closer to the air electrode 8 or closer to the center part 1b of the element portion 3 (3A, 90) than the first site and that has a smaller porosity or a lower density than the first site. Thus, the durability of the cell 1 (1A, 1B) can be enhanced.

In the cell 1 (1A, 1B) according to the embodiment, the porosity of the intermediate layer 7 near an interface between the intermediate layer 7 and the solid electrolyte layer 6 is greater than the porosity of the intermediate layer 7 near an interface between the intermediate layer 7 and the air electrode 8. Thus, the durability of the cell 1 (1A, 1B) can be enhanced.

In the cell 1 (1A, 1B) according to the embodiment, the porosity of the intermediate layer 7 in the outer peripheral part 1*a* of the element portion 3 (3A, 90) is greater than the porosity of the intermediate layer 7 in the center part 1*b*. Thus, the durability of the cell 1 (1A, 1B) can be enhanced.

In the cell 1 (1A, 1B) according to the embodiment, the porosity of the intermediate layer 7 ranges from 5% to 30%. Thus, peeling of the intermediate layer 7 can be suppressed.

In the cell 1 (1A, 1B) according to the embodiment, the intermediate layer 7 contains cerium oxide in which a rare earth element except Ce is in solid solution. Thus, the intermediate layer 7 can be provided with a function as a diffusion prevention layer for suppressing the formation of a $SrZrO_3$ resistive layer on the solid electrolyte layer 6.

In the cell 1 (1A, 1B) according to the embodiment, the intermediate layer 7 contains at least one element of Fe, Si, Na, Cl, Cu, Ti and Al as an impurity. Thus, the durability of the cell 1 (1A, 1B) can be enhanced.

In the cell 1 (1A, 1B) according to the embodiment, the solid electrolyte layer 6 includes, near at least two sides on the surface of the solid electrolyte layer 6, the third site 30 on which the intermediate layer 7 is not located, when viewed from the air electrode 8 side. Thus, the occurrence of cracks in the intermediate layer 7 can be suppressed.

In the cell 1 (1A, 1B) according to the embodiment, the solid electrolyte layer 6 located in the outer peripheral part 1*a* of the element portion 3 (3A, 90) is denser than the solid electrolyte layer 6 located in the center part 1*b*. This makes it difficult for the solid electrolyte layer 6 to peel off from the outer peripheral part 1*a* of the element portion 3 (3A, 90).

In the cell 1 (1A, 1B) according to the embodiment, near the interface between the solid electrolyte layer 6 and the intermediate layer 7, the solid electrolyte layer 6 is denser in the outer peripheral part 1*a* of the element portion 3 (3A, 90) than in the center part 1*b*. This makes it difficult for the solid electrolyte layer 6 to peel off from the outer peripheral part 1*a* of the element portion 3 (3A, 90).

The module 100 according to the embodiment includes a cell stack device 10 including the plurality of cells 1 (1A, 1B) described above, and the housing container 101 configured to house the cell stack device 10. Thus, the module 100 having high durability can be obtained.

The module housing device 110 according to the embodiment includes the module 100 described above, an auxiliary device configured to operate the module 100, and the external case 111 configured to accommodate the module 100 and the auxiliary device. Thus, the module housing device 110 having a high durability can be obtained.

Embodiments disclosed herein are considered exemplary in all respects and not restrictive. Indeed, embodiments described above may be embodied in a variety of forms. The above embodiments may be omitted, substituted, or modified in various forms without departing from the scope and spirit of the appended claims.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A cell comprising
an element portion, the element portion comprising:
  a fuel electrode;
  a solid electrolyte layer;
  an air electrode; and
  an intermediate layer located between the solid electrolyte layer and the air electrode, the intermediate layer comprising:
  a first site; and
  a second site that is located closer to the air electrode or closer to a center part of the element portion than the first site and that has a smaller porosity than the first site, wherein
  in an overlapped region of the air electrode and the intermediate layer, the porosity of the intermediate layer in the outer peripheral part of the intermediate layer is greater than the porosity of the intermediate layer in the center part.

2. The cell according to claim 1, wherein
a porosity of the intermediate layer near an interface between the intermediate layer and the solid electrolyte layer is greater than a porosity of the intermediate layer near an interface between the intermediate layer and the air electrode.

3. The cell according to claim 1, wherein
the porosity of the intermediate layer ranges from 5% to 30%.

4. The cell according to claim 1, wherein
the intermediate layer contains cerium oxide in which a rare earth element except cerium (Ce) is in solid solution.

5. The cell according to claim 4, wherein
the intermediate layer contains at least one element selected from the group consisting of Fe, Si, Na, Cl, Cu, Ti and Al as an impurity.

6. The cell according to claim 1, wherein
the solid electrolyte layer includes, near at least two sides on the surface of the solid electrolyte layer, a third site on which the intermediate layer is not located, when viewed from the air electrode side.

7. A cell comprising an element portion, the element portion comprising:
  a fuel electrode;
  a solid electrolyte layer, the solid electrolyte layer located in the outer peripheral part of the element portion being denser than the solid electrolyte layer located in the center part;
  an air electrode; and
  an intermediate layer located between the solid electrolyte layer and the air electrode.

8. The cell according to claim 7, wherein
near the interface between the solid electrolyte layer and the intermediate layer, the solid electrolyte layer is denser in the outer peripheral part of the element portion than in the center part.

9. A module comprising:
a cell stack device comprising a plurality of the cells according to claim 1; and
a housing container configured to house the cell stack device.

10. A module housing device, comprising:
the module according to claim 9;
an auxiliary device configured to operate the module; and
an external case configured to accommodate the module and the auxiliary device.

\* \* \* \* \*